US008463820B2

(12) United States Patent
Chhugani et al.

(10) Patent No.: US 8,463,820 B2
(45) Date of Patent: Jun. 11, 2013

(54) SYSTEM AND METHOD FOR MEMORY BANDWIDTH FRIENDLY SORTING ON MULTI-CORE ARCHITECTURES

(75) Inventors: Jatin Chhugani, Santa Clara, CA (US); Sanjeev Kumar, San Jose, CA (US); Anthony-Trung D. Nguyen, Castro Valley, CA (US); Yen-Kuang Chen, Cupertino, CA (US); Victor W. Lee, Santa Clara, CA (US); William Macy, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 557 days.

(21) Appl. No.: 12/454,883

(22) Filed: May 26, 2009

(65) Prior Publication Data

US 2011/0066806 A1    Mar. 17, 2011

(51) Int. Cl.
*G06F 7/00* (2006.01)
*G06F 17/30* (2006.01)
*G06F 13/00* (2006.01)
*G06F 13/28* (2006.01)
*G06F 12/00* (2006.01)

(52) U.S. Cl.
USPC ............................. 707/797; 711/133; 711/147

(58) Field of Classification Search
USPC ............ 707/797; 711/118, 120, 133, 147–48, 711/153
See application file for complete search history.

(56) References Cited

U.S. PATENT DOCUMENTS

| 5,179,699 | A  | * | 1/1993  | Iyer et al. ............................... 1/1 |
| 5,307,485 | A  | * | 4/1994  | Bordonaro et al. .................... 1/1 |
| 5,852,826 | A  | * | 12/1998 | Graunke et al. ....................... 1/1 |
| 7,581,076 | B2 | * | 8/2009  | Vorbach ........................ 711/202 |
| 7,657,877 | B2 | * | 2/2010  | Vorbach et al. ............... 717/141 |

OTHER PUBLICATIONS

Timothy Furtak, Jose Amaral and Robert Niewiadomski, Using SIMD Registers and Instructions to Enable Instruction-Level Parallelism in Sorting Algorithms, SPAA '07, published Jun. 11, 2007, pp. 348-357.*
Peter Varman, Balakrishna Iyer and Donald Haderle, an Efficient Mutliprocessor Merge Algorithm, IEEE, Published 1990, pp. 276-283.*
Richard Cole, Parallel Merge Sort, IEEE published 1986, pp. 511-516.*

(Continued)

*Primary Examiner* — Jeffrey A Burke
(74) *Attorney, Agent, or Firm* — Barnes & Thornburg LLP (57) ABSTRACT

In some embodiments, the invention involves utilizing a tree merge sort in a platform to minimize cache reads/writes when sorting large amounts of data. An embodiment uses blocks of pre-sorted data residing in "leaf nodes" residing in memory storage. A pre-sorted block of data from each leaf node is read from memory and stored in faster cache memory. A tree merge sort is performed on the nodes that are cache resident until a block of data migrates to a root node. Sorted blocks reaching the root node are written to memory storage in an output list until all pre-sorted data blocks have been moved to cache and merged upward to the root. The completed output list in memory storage is a list of the fully sorted data. Other embodiments are described and claimed.

28 Claims, 5 Drawing Sheets

OTHER PUBLICATIONS

Dina Bitton, David Dewitt, David Hsiao and Jaishankkar Menon, a Taxonomy of Parallel Sorting, Computing Surveys, vol. 16, No. 3, published Sep. 1984, pp. 288-318.*

Hiroshi Inoue, Takao Moriyama, Hideaki Komatsu and Toshio Nakatani, AA-Sort: A New Parallel Sorting Algorithm for Multi-Core Processors, 16th International Conference on Parallel Architecture and Compilation Techniques, published 2007, pp. 1-10.*

Jatin Chhugani, et al. "Efficient Implementation of Sorting on Multi-Core SIMD CPU Architecture", PVLDB '08, Aug. 23-28, 2008, Auckland, New Zealand, pp. 1313-1324.

Rhys Francis, et al. "A Fast, Simple Algorithm to Balance a Parallel Multiway Merge", In PARLE, 1993, pp. 570-581.

* cited by examiner

SYSTEM AND METHOD FOR MEMORY BANDWIDTH FRIENDLY SORTING ON MULTI-CORE ARCHITECTURES

FIELD OF THE INVENTION

An embodiment of the present invention relates generally to sorting large data sets on computing devices and, more specifically, to using an algorithm that minimizes memory reads/writes during a sort to reduce bandwidth bottlenecks.

BACKGROUND INFORMATION

Various mechanisms exist for sorting large amounts of information on computing devices. Sorting a list of numbers is a fundamental problem of Computer Science, and is probably the most widely used kernel, spanning a wide range of applications. The current trend of processors is to fit more and more cores, thereby increasing the compute power, and improving performance. However, memory bandwidth is not increasing at a proportional rate, and sorting applications become memory bandwidth-bound for list sizes greater than 1-2 million elements, with practical sizes being in the range of 100 million to 1 billion elements.

Simultaneously merging of data on multiple processors has been proposed in the past as a solution to reduce the bandwidth requirements. However, those algorithms have certain computational overhead and have not been applied in practice. In addition, they are not SIMD (single instruction, multi-data) friendly. Furthermore, their scaling to large number of cores on chip multiprocessors is not evident.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to performing tree merging that scales well to large number of cores. In addition, there is no extra computational overhead. The resultant algorithm is also SIMD friendly. Overall, the sorting performance is almost independent of the memory bandwidth.

For purposes of illustration, the following terminology will be used throughout this description.

Nt: total number of elements to be sorted
Nl: number of leaf nodes in a tree
L: a set of sorted lists $\{l_1, l_2, \ldots l_{Nl}\}$; |L|=Nl
Nint: number of internal nodes in a tree
$Sl_i$: size of a pre-sorted list $l_i$ (i=1, 2, ..., Nl); $S=Sl_i$ if list size are the same
Nb: a block/chunk of elements that move up the tree as a single unit
Nc: number of elements that the cache can hold
Ss: SIMD width Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
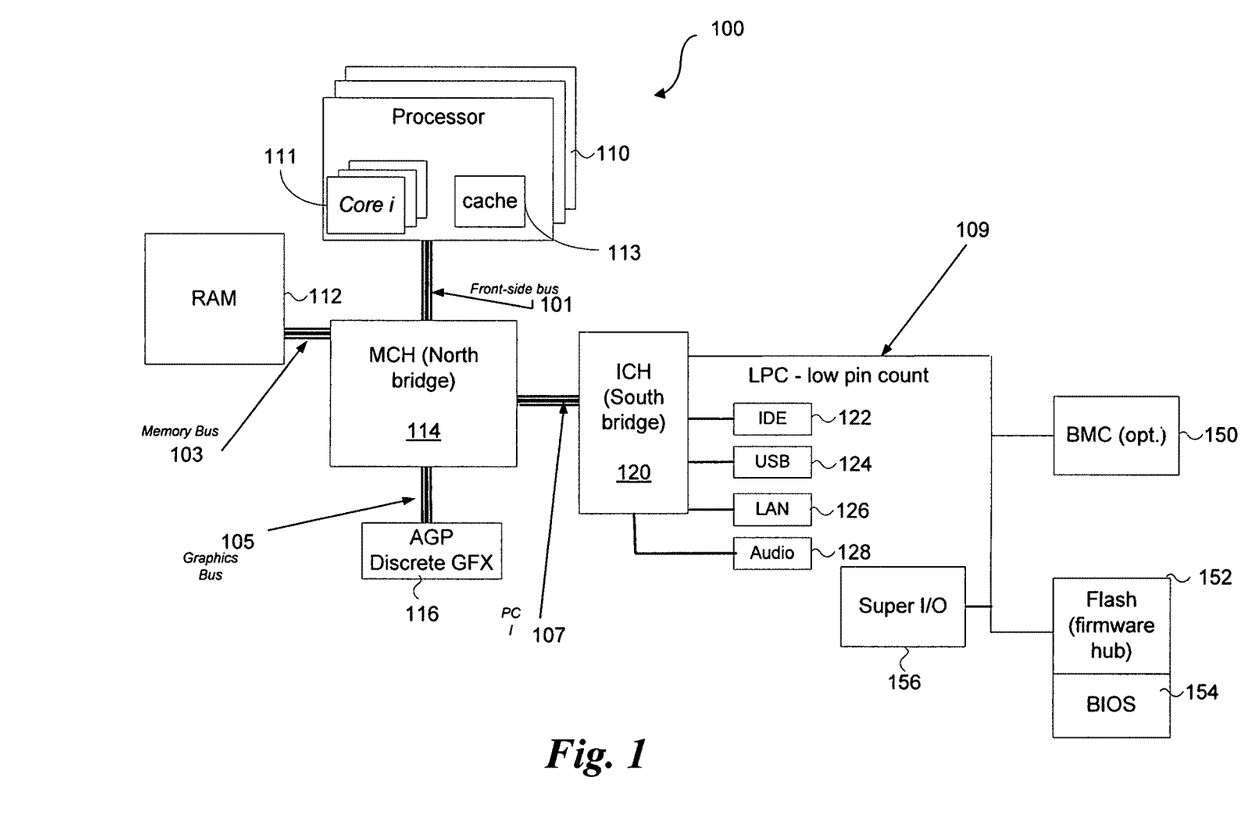
FIG. 1 is a block diagram of an exemplary computing platform on which embodiments of the invention may be utilized.

FIG. 1 is a block diagram of a system 100 including main processor elements including multi-core and cache parts. In an embodiment of the invention, processor 110 communicates with a memory controller hub (MCH) 114, also known as North bridge, via the front side bus 101. The MCH 114 communicates with system memory 112 via a memory bus 103. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 109.

Processor 110 may be any type of processor capable of executing software, such as a microprocessor, digital signal processor, microcontroller, or the like. Though FIG. 1 shows only one such processor 110, there may be one or more processors in platform hardware 100 and one or more of the processors may include multiple threads, multiple cores 111, or the like. Processor 110 may be directly coupled to cache memory 113. In a multi-core or multi-processor environment, there may be multiple cache memory units coupled to one or more processing units, cores or processors, in the processor 110. This cache memory 113 may be configured to execute as random access memory (RAM), e.g., cache-as-RAM (CAR) before system RAM has been initialized. In an embodiment, some firmware code may execute in place in Flash memory 152 and some code may execute in CAR during the boot process.

Memory 112 may be a hard disk, a floppy disk, random access memory (RAM), read only memory (ROM), Flash memory, or any other type of medium readable by processor 110. Memory 112 may store instructions for performing the execution of method embodiments of the present invention.

Non-volatile memory, such as Flash memory 152, may be coupled to the IO controller via a low pin count (LPC) bus 109. The basic input output system (BIOS) firmware 154 typically resides in the Flash memory 152 and boot up will execute instructions from the Flash, or firmware. Some portions may execute from CAR, as discussed above.

In some embodiments, platform 100 is a server enabling server management tasks. This platform embodiment may have a baseboard management controller (BMC) 150 coupled to the ICH 120 via the LPC 109. In other embodiments, the platform 100 may be coupled to an independent microprocessor having access to the firmware, where the independent microprocessor (not shown) has a separate out of band connection and contains a manageability engine code, for instance using Intel® Active Management Technology.

Many sort algorithms have been developed over the years to speed sorts. However, these algorithms are simply directed toward reducing the compute times. In cases, when the data is not all resident in cache at the same time, it cannot be efficiently sorted/processed without also minimizing reads/writes from/to memory. Thus, embodiments of the invention utilize a tree merge to sort data while minimizing, or optimizing, the reads from memory into cache, and vice-a-versa. This is especially important in multi-core, mutli-processor and SIMD architectures, because compute time is even faster.

Existing systems, often use hash based sorting. However, in a hash based sort a few bits in the data are sorted at a time. For instance, for a 32-bit integer, perhaps 12 bits are sorted in each iteration of the process. If 12 bits are sorted at a time, then the number will be sorted in three iterations. Thus, in this case data is retrieved from main memory three times—once for each iteration. There are three round trips from memory to cache in this method, because there is a partial sort in each iteration. This partial sorting is performed because the cache cannot hold all of the data at once. This method sorts parts of each data item at a time.

Memory bandwidth is one of the key bottlenecks for sorting on current architectures. There are existing techniques that aim at producing independent lists that can be sorted individually in a cache friendly fashion and written to the appropriate locations in the output array. However, it is often hard to find the right set of "partitioning elements" that divide the list into such chunks. As a consequence, the performance is dictated by the memory bandwidth and the sorting algorithm does not exploit the multiple processors on the current chips. Algorithms like MergeSort have not been used, in practice, for large datasets since a few of the merging iterations are bandwidth bound, and produce large runtimes.

Embodiments of the invention are directed toward a multi-core friendly algorithm for tree merging. Embodiments of the invention scale well with processors having a large number of cores, and have minimal computational overhead. In addition, embodiments are SIMD friendly, and make sorting performance almost independent of the memory bandwidth. In an embodiment of the invention, each element is only read/written twice from/to the main memory to/from the physical memory caches. Sorting methods used in existing system often require many more reads/writes to/from memory and cache. Computation performance is dependent on the memory bandwidth bottlenecks. Thus, as long as the time to read and write twice is less than the time to perform the computation, the sorting performance is compute bound, rather than memory bound.

Figure 2:
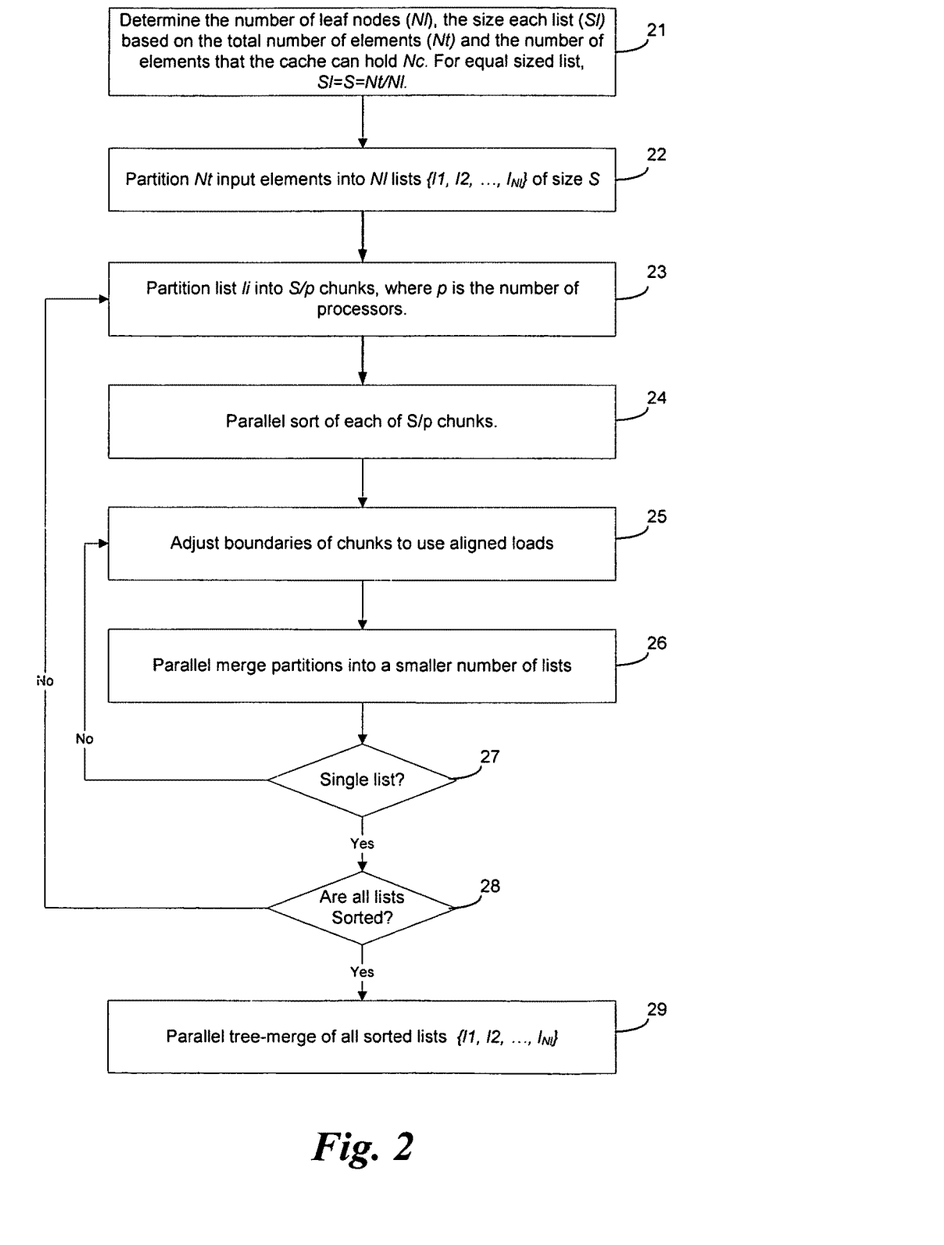
FIG. 2 is a flow diagram of a method for tree merging, according to an embodiment of the invention.

Referring now to FIG. 2, there is shown a flow chart of a method for tree merging, according to an embodiment of the invention. First, the number of leaf nodes N1 and size of each list Sl is determined in block 21. This calculation is based on the total number of elements (Nt) and the number of elements that the cache can hold Nc. For equal sized lists, Sl=S=Nt/Nl. The Nt input elements are partitioned into Nl lists {l1, l2, ..., $l_{Nl}$} of size S, in block 22. The lists may be partitioned according to the number of processors on the platform, in block 23. List li may be partitioned into S/p chunks, where p is the number of processors.

A parallel sort of each of S/p chunks may be performed in block 24. Each of the lists, li, may be sorted using SIMD-friendly memory accesses using multiple threads. For SIMD-friendly memory accesses, the boundaries of chunks may be adjusted to use aligned loads, in block 25. Details of this type of sort will be described more fully, below. Partitions may be parallel merged into a smaller number of lists, in block 26. We iterate steps for Nl times until all lists are sorted. A determination is made as to whether the partitions have been merged into a single list in block 27. If so, processing continues at block 25. Once a single list has been generated, a determination is made as to whether all lists have been sorted, in block 28. If not, the next list is partitioned and sorted, beginning again at block 23.

Once all of the lists have been sorted, a parallel tree merge of all sorted lists {l1, l2, ... $l_{Nl}$} ma be performed in block 29. The complete list of Nt elements may be sorted using a tree-merging technique, using multiple threads, as described more fully below.

In an embodiment of the invention, prior to performing the tree merging pass, a list of Nl=|L| sorted lists {$l_1, l_2, \ldots, l_{Nl}$} is obtained, with each list consisting of sorted elements, L={$l_1, l_2, \ldots, l_{Nl}$}, as discussed above. The size $Sl_i$ of each list $l_i$ is pre-determined so that the list fits in the cache memory, and hence each of these lists are sorted, or processed, by reading/writing each data element only once from/to the main memory. In one embodiment, the total number of Nt elements is evenly distributed to the Nl sorted list and thus $Sl_1 = Sl_2 = \ldots = Sl_K = Sl$. And, Sl*Nl=Nt. It should be noted that the data elements reside in the main memory before the start of the tree merge phase. In another embodiment, for instance for database joins, each list $l_i$ may be unsorted or only partially sorted.

Determining the size Sl of the pre-sorted list $l_i$ and the number of leaf nodes Nl is important to ensure that the lists will fit in cache memory, while being processed. Each leaf node $l_i$ may be individually sorted in one pass, so it is desirable for the number of elements S in the list to be less than the cache size. For a binary tree with Nl leaf nodes, there may be Nint internal nodes in total, where Nint=Nl−2. During the processing, each internal node has a block of Nb elements in the cache, where a block of Nb elements is smaller than a size S of the pre-sorted list $l_i$ in one embodiment, that is, Nb≦S. So Nb*(Nl−2) should be smaller than the cache size. If the cache can hold Nc elements, the following equations are used to determine the S, Nb, and Nl in embodiments of the invention.

S*Nl=Nt, where

S≦Nc

Nb*(Nl−2)≦Nc

Nb≦S

Figure 3:
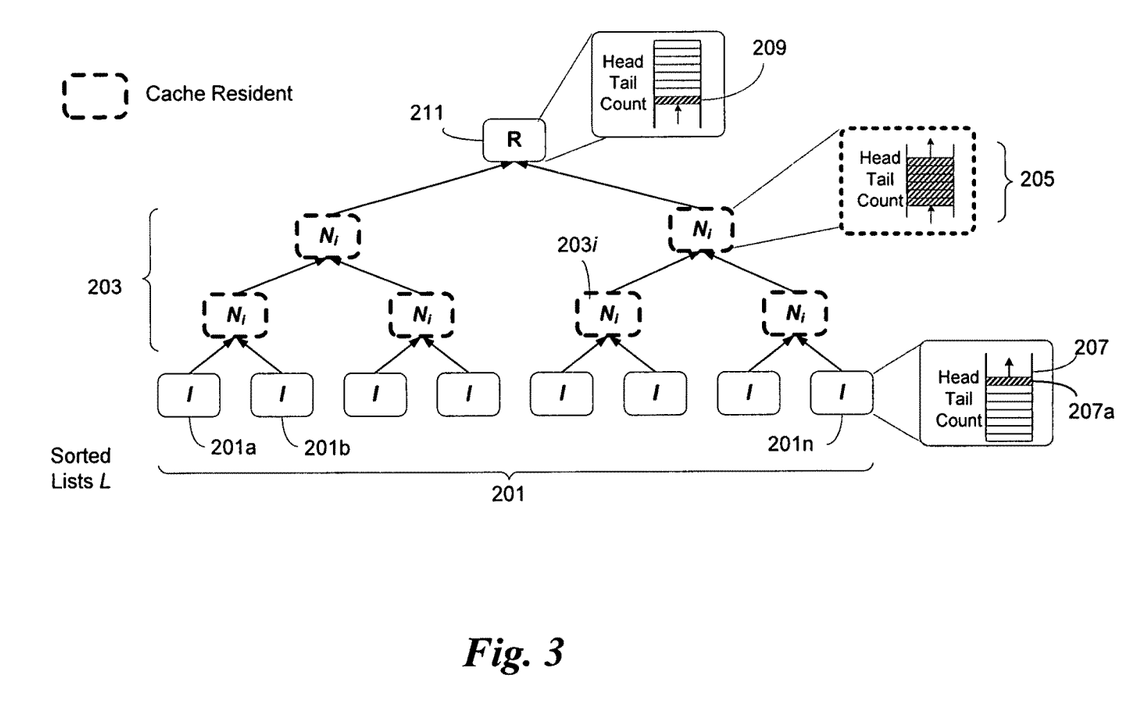
FIG. 3 is a block diagram illustrating cache resident lists in a sort, according to embodiments of the present invention.

Referring now to FIG. 3, individually sorted lists are denoted as l 201, as leaf nodes along the bottom of the tree. For illustrative purposes, eight (8) lists are shown, for simplicity. However, it will be apparent that the number of sorted lists may be greater or smaller than eight. It should be understood that all of the data in these lists resides in the main memory, and the task at hand is to sort, or process, the data. A binary tree of nodes is built (as shown with nodes labeled $N_i$ 203), that are all cache resident (except the root (R) 211), that contains the final sorted/processed list, and resides in the main memory. In an alternative embodiment, a d-ary tree may be built, rather than a binary tree. In either case, each node $N_i$ 203 will have two or more inputs (children) and one output (parent). Since the number of internal nodes is known (Nl−2), where Nl is the number of leaf nodes 201*a-n*, the size of each node is pre-determined so that all of the nodes, except for the root node 211, can reside in the caches simultaneously. In an embodiment of the invention, each internal node has a FIFO (first-in/ first-out) queue 205 (implemented as a circular buffer) to store partial results for each intermediate iteration.

Elements may be merged in an intelligent fashion that allows all of the internal nodes to be resident in a cache. The working set of any internal node at any time is c*Nb, where Nb is the block size and c is the number of blocks. For a binary tree with two children per internal node, c is 2 if sort in-place (i.e., input buffers are used to store results) or 4 if sort out-of-place (i.e., separate input and output buffers are used). Similarly, for d-ary tree with d children, c=d for in-place and c=2d for out-of-place. The total working set for all internal nodes are Nint*c*Nb, where Nint are the number of internal nodes. Typically, the elements in the cache at the leaves and the root are few, and do not contribute significantly to the working set.

Embodiments of the invention may be implemented on a platform utilizing a SIMD architecture. Thus, a block of merged elements is produced, where the block size is a multiple of the SIMD width. And hence, in the discussion herein, a block of elements is referred to rather than a single element. In an embodiment, a SIMD merge may be described as follows. Assume there are two sorted lists, X and Y, that must be merged to produce one sorted list. First, W values are loaded, where W is the SIMD width, each from the two arrays X and Y. Then, the W smallest values are merged (in the case of sort) into the output array, leaving W larger values for merging with the next chunk of W values from either X or Y arrays, whichever has the minimum next value. Unaligned loads are eliminated during the merging phase in order to help the process' efficiency significantly.

Some applications process lists of data using methods which cannot assure that data begins on an aligned memory boundary. Embodiments of the invention utilize a method for processing lists that begin and/or end on unaligned boundaries using aligned accesses. Some aspects of this process focus on sorting using SIMD instructions, but embodiments can be used for other applications and methods for processing multiple data.

Typically multithreaded sorting techniques have two phases. In the first phase, each thread sorts data assigned to it. Any of the commonly known sorting techniques may be used in this first phase. If there are S elements in a list and p threads, then each thread may sort its own partial list consisting of S/p elements of the full list. Data may be aligned in this phase. In the second phase, the threads cooperate merging the sorted lists generated in the first phase. The term merging here means that two sorted lists are combined to form a single sorted list containing the data of the initial two sorted lists. An efficient method for the second phase which assures that each thread merges the same amount of data and that the resulting sorted lists produced by the merge operations do not overlap is described by R. S. Francis, I. D. Mathieson, and L. Pannan. *A Fast, Simple Algorithm to Balance a Parallel Multiway Merge.* (In PARLE, pages 570-581, 1993) (hereinafter, "Francis [1]"). However, this method does not assure that data is read on aligned boundaries for each thread.

Figure 4:
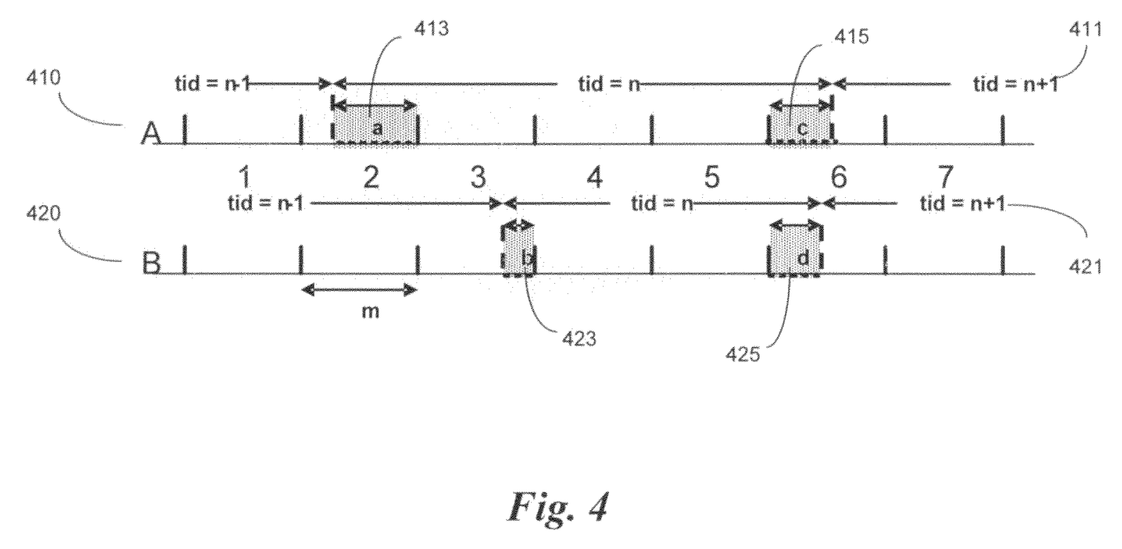
FIG. 4 is a block diagram of two sorted arrays, A and B, to be sorted according to an embodiment of the invention.

Referring now to FIG. 4, there is shown a block diagram of two sorted arrays, A 410 and B 420, to be sorted according to an embodiment of the invention. Threads merge sections of the two arrays assigned to them. Threads are identified by their tid number 411 and 421. All of the data to be merged between the dashed vertical lines by thread n are shown, and part of the sorted data to be merged by thread n−1 on the left and thread n+1 on the right are shown. The solid vertical lines represent aligned addresses in the arrays. The separation of aligned addresses, represented by m, equals the number of bytes between aligned addresses. Generally, in the case of SIMD operations, the number of bytes between aligned addresses equals the number of bytes that are stored in a SIMD register. Numbers 1 through 7 identify segments of data whose first element is memory aligned on the vertical line on the left side of the segment.

In the FIG. 4, unaligned sections between aligned boundaries assigned to thread n are indicated by the dotted regions. During the simultaneous multi-thread merging phase, conventional algorithms merge two arrays via unaligned loads from a 413 to c 415 and from b 423 to d 425. A smarter algorithm can use prolog and epilog codes to handle the beginning and ending unaligned loads. However, most prolog and epilog codes are not 'SIMDified'.

A technique is used herein that eliminates unaligned loads during the simultaneous multi-thread merging phase. The authors have observed that the outputs of the threads are always aligned stores and the first thread starts with two aligned addresses. Although the starting points of the second thread may not be aligned, the sum of the number of unaligned elements must be equal to the width of SIMD register. More specifically, the sum of lengths of the unaligned sections at the beginning of data assigned to each thread, the sum of a and b for thread n, and the sum of lengths of unaligned data at the end, the sum of c and d, equal the distance between aligned memory positions, m. However, if the beginning or end of the section assigned to a thread of one sorted array is aligned then the beginning or end, respectively, of the second sorted array is also aligned. These relationships result from making the lengths of the sorted arrays divisible by the product of the distance between aligned memory positions, m, and the number of threads, p. If initially a sorted array is not divisible by the product of m and p then it is padded at the end by maximum values making it divisible by the product.

Threads load data on unaligned boundaries in the conventional method for merging arrays. Using the conventional method, thread n loads data beginning on the unaligned boundary indicated by the vertical dashed line on the left and progresses to the unaligned boundary indicated by the vertical dashed line on the right. Values assigned to thread n are guaranteed to be greater than or equal to values assigned to thread n−1, and less than or equal to values assigned to thread n+1 by the partition algorithm. In this discussion, ascending sorted order is assumed, but methods described here also apply to descending sorted order. In the case of descending sorted order, comparisons using "greater than" here may be replaced by "less than," and comparisons of "less than" may be replaced by "greater than." Consequently, the sorted array generated by merging sections of A 410 and B 420 can be concatenated with sorted arrays generated by other threads.

A thread can load and manipulate data assigned to another thread, but it cannot store data assigned to another thread in the output without possibly corrupting the sorted order of the output.

The region assigned to thread n begins on an unaligned address in aligned segment 2 of array A 410 and an unaligned address of aligned segment 3 of array B 420. The observation that the number of bytes in a SIMD register equals the separation between aligned addresses is used. First, aligned loads store all of segment 2 of array A and all of segment 3 of array B in two SIMD registers. Some of the data that is loaded is assigned to thread n, and some is assigned to thread n−1. The total number of bytes assigned to these threads equals the number of bytes in a SIMD register. This is true (as explained previously) because the sum of the data in the unaligned regions assigned to a thread equals the distance between aligned addresses and the number of bytes between address (equal to the number of bytes in a SIMD register).

Next, segment data loaded in the SIMD registers are merged to form a sorted array with a length of two registers, with lower values in one register and higher values in the other. Lower values in one register are those assigned to thread n−1 and higher values in the other register are those assigned to thread n. This is true because the partition procedure which assigns data to each thread assures that there is no overlap in values permitting concatenation of sorted merged segments generated by each thread.

Thread n selects the either segment 3 of array A or segment 4 of array B to merge with elements in the SIMD register with the higher values generated in the initial merge of segment 2 in array A and segment 3 in array B. Thread n compares values of the first element of segment 3 of array A and the first element of segment 4 of array B, and selects the segment with the smaller first value. The selected segment is loaded on aligned boundary and merged.

The remaining data assigned to thread n is merged using aligned loads. Thread n stops after it has merged segment 6 of A and segment 6 of B. The algorithm assures that these two will be merged before either segment 7 of A or segment 7 of B. This is true because a segment is selected to be merged using the first element in the segment. The first elements of both segment 6 of A and segment 6 of B are assigned to thread n. All values assigned to thread n are less than or equal to those assigned to thread n+1. Just as in the case of the first merge operation by thread n, the last merge operation produces one SIMD register with data assigned to it and another SIMD register with data assigned to the adjacent thread.

In any application running on the platform that requires sorting, or processing, of large amounts of data, it is important to reduce bandwidth bottlenecks that cause the arithmetic logic units (ALU) to have to wait for data. In some applications, the set to sort may be larger than cache memory, or even system memory. In either case, it is most efficient for the ALU to sort items that are located in the faster cache memory. Sorting mechanisms in existing systems must often read and write data items from/to cache memory to/from system memory or other storage media, when all of the data cannot fit into cache memory at one time.

Also, for this discussion the concept of a "ready" node is defined such that: a node is deemed "ready" when there is an empty slot in its FIFO queue, and each of its children has at least one block of elements in its queue. Whenever a node is ready, the node produces a block of merged elements (from its children), and if the node's sibling(s) are also ready, the parent is signaled as ready. In case of leaf nodes, once their elements have been consumed, a block of elements is read from the main memory to the cache to replenish the cache with leaf node block elements. In embodiments of the invention, this is the only time an element is read into the cache. The leaf node element are then merged up to the root, and then subsequently pushed to the main memory. A list of ready nodes is maintained, and the embodiments of the invention push the parents of the leaf nodes as ready nodes. The moment a processor is idle, a ready node is popped and its children merged. By definition, the list will be finally sorted/processed when no such ready nodes exist, in which case the sorting process terminates, having produced a sorted/processed list.

Figure 5:
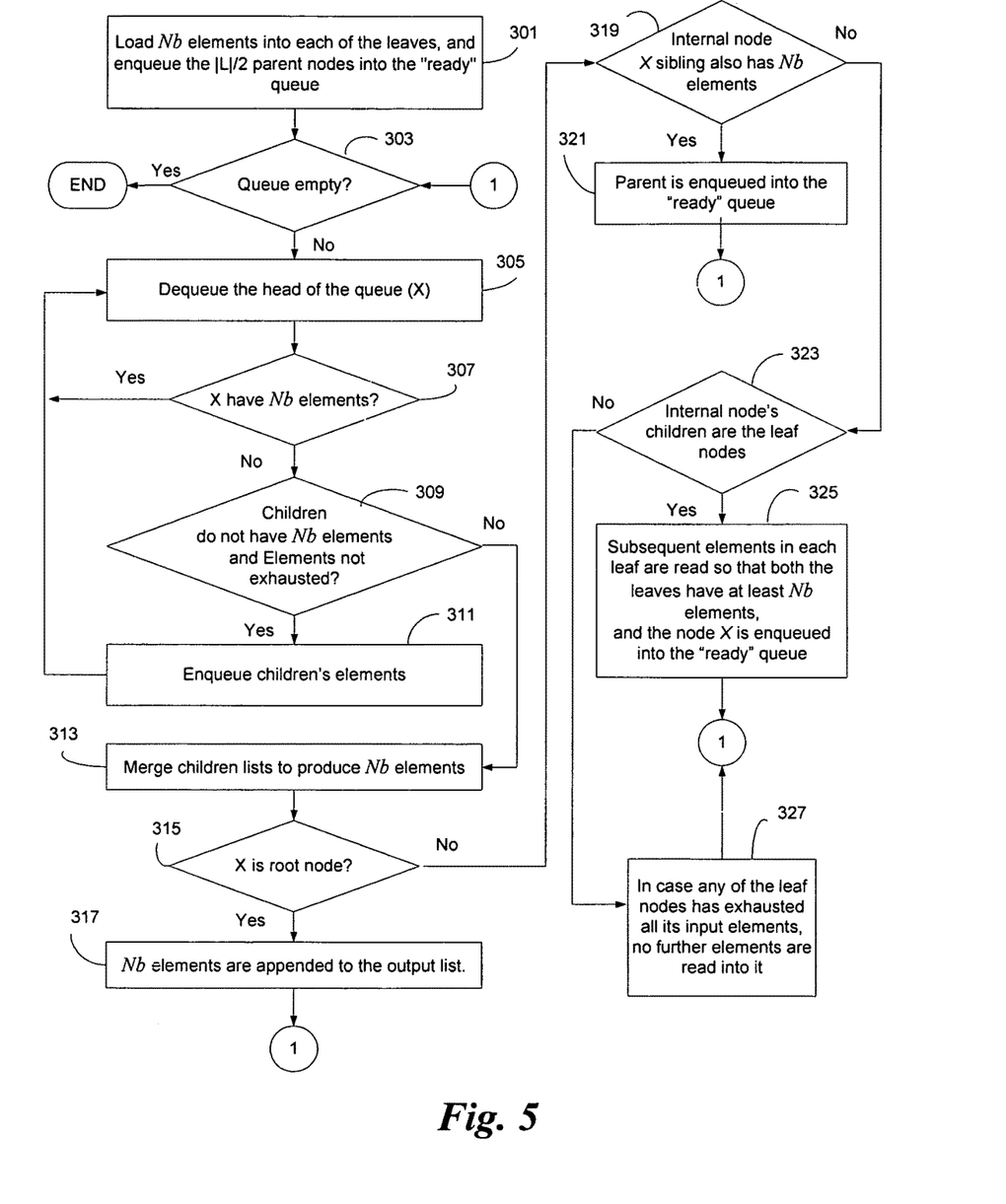
FIG. 5 is a flow diagram illustrating the method tree merge and associated cache accesses, according to an embodiment of the invention.

Nb elements are loaded into each of the leaves 201, in block 301, and |L|/2 parent nodes are enqueued into the "ready" queue. While the queue is not empty, as determined in block 303, the head 207a of the queue 207 in node (X) is dequeued in block 305. If node X already has Nb elements, as determined in block 307, then processing continues in block 305.

If any of node X's children do not have Nb elements, i.e., having merged Nb elements from its children, (and have not yet exhausted all the elements), as determined in block 309, then the children's elements are enqueued to the queue, in block 311, and processing continues at block 305. If all of node X's children do have Nb elements, then node X's children lists are merged to produce Nb elements, in block 313.

If node X is the root node 211, the Nb elements 209 are appended to the output list, in block 317, and processing continues at block 303 until the queue is empty.

If node X is one of the internal nodes, i.e., not the root node as determined in block 315, (one of the nodes labeled as N, see FIG. 2), then a determination is made as to whether node X's sibling has Nb elements, in block 319. If so, then the parent is enqueued into the "ready" queue, in block 321. If the sibling of X does not have Nb elements, then a determination is made as to whether the children of X are the leaf nodes 201, in block 323. If so, then the subsequent elements in each leaf are read so that both the leaves have at least Nb elements, in block 325. The node X is then enqueued into the "ready" queue. In case any of the leaf nodes has exhausted all its input elements, no further elements are read into it in block 327.

The above method operates efficiently because the merging is done in multiple ways at one time. Referring again to FIG. 2, because the lists L 201a to 201n are already sorted, the minimum data element will exist within one of the first block in a leaf. Thus, even though $L_i$ has multiple blocks, only one block at a time need be moved from memory into cache, into a node $N_i$ 203. The first read from memory, and write to cache will take the first block of sorted data in each leaf $L_i$. Since each of the blocks is sorted, it is guaranteed that the minimum will exist in one of the first blocks of data read into cache, into one of the nodes 203. Thus, this data will not need to be read and written to cache more than once. Even if node 203$i$, for instance, has all of the minimum elements, each element in this block will migrate to the root node R 211 during the sort of data in cache and then be written to memory. Once the elements of a node are depleted, then no more sorting for that node is required and it is ignored until the entire queue is empty. It will be apparent, that even though there is no guarantee that the leaves be sorted in any particular fashion, that cache reads and writes are limited. Once an element migrates up to the root, it is written to the output list in memory and is not needed again. Elements are only read from memory and placed in cache as blocks are depleted in the sort, by migrating to the root. Thus, the multiple "round-trips" for cache reads/writes of existing sort methods are avoided.

The list of ready nodes can be viewed as a list of tasks, and the whole infrastructure may be implemented using an efficient software mechanism that maintains and distributes the tasks among the processors. In one embodiment, the child node and the parent node are assigned to the same processor to capture the cache localities.

A prototype of an embodiment of the invention has been implemented on an exemplary platform, as specified in Table 1. The runtime is measured on a system with a single Intel® Q9550 quad-core processor with a core clock speed of 3.22 GHz.

TABLE 1

System Parameters.

| | |
|---|---|
| Core Clock Speed | 3.22 GHz |
| Number of Cores | 4 |
| L1 Cache | 32 KB/Core |
| L2 Cache | 12 MB |

TABLE 1-continued

System Parameters.

| | |
|---|---|
| Front-Side Bandwidth | 10.6 GB/sec |
| Memory Size | 4 GB |

Results of testing an embodiment of the described tree merging process are outlined in Table 2. For this test, the input dataset was a random distribution of single precision floating point numbers (32-bits each).

Since the L2 cache size is 12 MB, only up to 1.5 million elements can be cache resident at any instance of time. The number of input elements was varied from 512K to 256M elements. Table 2 shows the runtimes (in seconds) from 1-core to 4-core with and without utilizing an embodiment of the invention, as described above. The sorting algorithm used is a SIMD friendly merge sort, as described in the author's paper entitled, *Efficient Implementation of Sorting on Multi-Core SIMD CPU Architecture*, by Jatin Chhugani et al., (VLDB 2008, 34th International Conference on Very Large Data Bases, Auckland, New Zealand, Aug. 24-30, 2008).

Other methods for sorting large data sets may be found in the Francis[1], as discussed above. The methods described in this paper compute the appropriate "separating elements" that divide the list equally amongst the cores, and then each core merges the appropriate chunk. As an example, for parallelizing to four (4) threads, the four quarter quantiles (i.e. $\frac{1}{4}$th, $\frac{2}{4}$th, $\frac{3}{4}$th and $\frac{4}{4}$th) elements are computed, and then each thread computes the appropriate intervals in each of the leaf sorted lists, and merges its portion. This has the overhead of computation, and suffers from SIMD inefficiency. On the other hand, embodiments of the present invention avoid this computation, and are SIMD-friendly at the same time.

Existing sort methods, such as the IPP (Intel® Performance Primitive) Sort, are not included in the testing results, because those sorts result in much worse performance than the described methods for large data sets. The IPP Sort uses radix sort that load/stores elements three times from/to the main memory, and is bandwidth bound for large number of elements. Embodiments of the present invention require only two round trips to main memory, rather than three, and require very little computational overhead. This is an advantage of existing bandwidth bound methods. It should be noted, that in Table 2, a smaller number is better, since it implies a faster running time.

TABLE 2

Sort Performance Results (in seconds)

| Size (Number of Elements) | 1-core (without our technique) | 1-core (with our technique) | 4-cores (without our technique) | 4-core (with our technique) |
|---|---|---|---|---|
| 512K | 0.0088 | 0.0088 | 0.02227 | 0.02227 |
| 1M | 0.0195 | 0.0195 | 0.0060 | 0.0060 |
| 2M | 0.0393 | 0.0393 | 0.0127 | 0.0127 |
| 4M | 0.0843 | 0.0831 | 0.0320 | 0.0269 |
| 8M | 0.1814 | 0.1763 | 0.0706 | 0.0560 |
| 16M | 0.3894 | 0.3739 | 0.1608 | 0.1170 |
| 32M | 0.8315 | 0.7894 | 0.3594 | 0.2429 |
| 64M | 1.7810 | 1.6738 | 0.7867 | 0.4989 |
| 128M | 3.8828 | 3.6151 | 1.9103 | 1.0742 |
| 256M | 8.4217 | 7.7739 | 4.7912 | 2.4521 |

As evident in Table 2 above, for sizes that fit in the L2 cache (i.e. number of elements less than or equal to 2 million), similar results are obtained with and without the described tree merge technique. However, as the number of elements start to grow, embodiments of the invention produce smaller running times even for a single-core, and in fact is up to 10% faster on a single core. For multiple cores (4-cores), embodiments of the invention lead to an improvement from 5-49% as compared to not using this method. Thus, an additional speedup of around 2 times on 4-cores itself, may be obtained. This speed up would be further enhanced with increasing the number of cores, and augurs well for future multi-core architectures.

Embodiments of the present invention are well suited for applications such as searching and sorting data in large databases, including maps, such as used in Google.com. Map reduce applications use enormous amounts of data that obviously cannot reside in cache memory at one time. Existing systems implementing these kinds of applications are well known for being bandwidth bound. Thus, using embodiments of the present invention will significantly increase performance in these types of applications.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer implemented method, comprising:
    providing a plurality of lists of data, wherein each list is stored in a corresponding leaf node of a plurality of leaf nodes, the plurality of leaf nodes residing in memory storage coupled to the platform;
    building a d-ary tree of a plurality of cache resident nodes from the plurality of lists of data, wherein the plurality of cache resident nodes are resident in a cache memory and are sized such that all of the cache resident nodes can reside in the cache memory simultaneously, the building comprising:
        merging a block of data elements from each leaf node into a first set of parent nodes, the first set of parent nodes being immediate parents of the leaf nodes and being cache resident nodes,
        merging blocks of data elements from the first set of parent nodes to a next set of parent nodes, the next set of parent nodes being cache resident nodes, until a block of data reaches a root node resident in the memory storage, wherein the root node has children, but no parent,
        writing block elements that have reached the root node to the memory storage as an output list of processed data, and
        populating each parent node with blocks of data from the plurality of nodes which are children of the parent node when the parent node has passed a block upward to a next immediate parent of the parent node.

2. The method as recited in claim 1, wherein the d-ary tree is a binary tree.

3. The method as recited in claim 1, wherein merging of data elements comprises sorting the data elements, and where the output list comprises a sorted list.

4. The method as recited in claim 1, wherein each of the plurality of lists of data is pre-sorted before being stored in the corresponding leaf node.

5. The method as recited in claim 4, further comprising:
    preparing the pre-sorted lists of data by loading data from the memory storage, where the memory loads are SIMD-width aligned.

6. The method as recited in claim 1, wherein the merging blocks of data elements from children nodes to a next immediate parent node comprises:
    determining if the next immediate parent node is ready; and
    when the next immediate parent node is ready, then merging blocks of data from the children node elements into the next immediate parent node.

7. The method as recited in claim 6, wherein the next immediate parent node is ready when the children nodes have blocks of data ready to merge.

8. The method as recited in claim 1, wherein a size S of each list of data to be processed is based in part on at least a size of the cache memory and a quantity of leaf nodes.

9. The method as recited in claim 1, further comprising:
    performing one or more of the merging tasks while building of the d-ary tree in parallel on a plurality of processing elements in a platform.

10. The method as recited in claim 1, wherein when each block of merged elements is produced, a size of the block is a multiple of a SIMD width.

11. A system comprising:
    a platform having at least one processor element, the at least one processor element coupled to a memory store and cache memory, wherein access to the cache memory is faster than access to the memory store;
    a tree merge unit configured to build a d-ary tree of a plurality of cache resident nodes from plurality of lists of data, wherein the plurality of lists of data are leaf nodes resident in the memory store, and wherein the plurality of cache resident nodes are resident in the cache memory and are sized such that all of the cache resident nodes can reside in the cache memory simultaneously, wherein the building comprises:
        merging a block of data elements from each leaf node into a first set of parent nodes of the leaf node, the first set of parent nodes being cache resident nodes,
        merging blocks of data elements from the first set of parent nodes to a next set of parent nodes until a block of data reaches a root node, the next set of parent nodes being cache resident nodes,
        writing block elements that have reached the root node to the memory store as an output list of processed data, and
        populating each parent node with blocks of data from the plurality of nodes which are children of the parent node when the parent node has merged all of its blocks upward to a next immediate parent of the parent node.

12. The system as recited in claim 11, wherein the d-ary tree is a binary tree.

13. The system as recited in claim 11, wherein the tree merge unit is further configured to sort the data elements, and wherein the output list comprises a sorted list.

14. The system as recited in claim 11, wherein the tree merge unit is configured to accommodate pre-sorted data comprising the plurality of lists of data.

15. The system as recited in claim 11, wherein the tree merge unit is further configured such that the merging blocks of data elements from children nodes to a next immediate parent node comprises:
 determining if the next immediate parent node is ready; and
 when the next immediate parent node is ready, then merging blocks of data from the children node elements into the next immediate parent node.

16. The system as recited in claim 15, wherein the next immediate parent node is ready when the children nodes have blocks of data ready to merge.

17. The system as recited in claim 11, wherein a size S of each list of data to be processed is based in part on at least a size of the cache memory and a quantity of leaf nodes.

18. The system as recited in claim 11, further comprising a plurality of processor elements, wherein the tree merge unit is further configured to perform one or more of the merging tasks while building of the d-ary tree in parallel on the plurality of processing elements.

19. The system as recited in claim 11, wherein when each block of merged elements is produced, a size of the block is a multiple of a SIMD width.

20. A tangible, machine readable storage medium having instructions stored thereon, when the instructions are executed on a machine, cause the machine to:
 receive a plurality of lists of data, wherein each list is stored in a corresponding leaf node of a plurality of leaf nodes, the plurality of leaf nodes residing in memory storage coupled to the platform;
 build a d-ary tree of a plurality of cache resident nodes from the plurality of lists of data, wherein the plurality of cache resident nodes are resident in cache memory and are sized such that all of the cache resident nodes can reside in the cache memory simultaneously, the building comprising further instructions to:
 merge a block of data elements from each leaf node into a first set of parent nodes, the first set of parent nodes being immediate parents of the leaf nodes and being cache resident nodes,
 blocks of data elements from the first set of parent nodes to a next set of parent nodes, the next set of parent nodes being cache resident nodes, until a block of data reaches a root node resident in the memory storage, wherein the root node has children, but no parent,
 write block elements that have reached the root node to the memory storage as an output list of processed data, and
 populate each parent node with blocks of data from the plurality of nodes which are children of the parent node when the parent node has passed a block upward to a next immediate parent of the parent node.

21. The medium as recited in claim 20, wherein the d-ary tree is a binary tree.

22. The medium as recited in claim 20, wherein merging of data elements comprises further instructions to sort the data elements, and where the output list comprises a sorted list.

23. The medium as recited in claim 20, wherein each of the plurality of lists of data is pre-sorted before being stored in the corresponding leaf node.

24. The medium as recited in claim 20, wherein the merging blocks of data elements from children nodes to a next immediate parent node further comprises instructions to:
 determine if the next immediate parent node is ready; and
 when the next immediate parent node is ready, then merge blocks of data from the children node elements into the next immediate parent node.

25. The medium as recited in claim 24, wherein the next immediate parent node is ready when the children nodes have blocks of data ready to merge.

26. The medium as recited in claim 20, wherein a size S of each list of data to be processed is based in part on at least a size of the cache memory and a quantity of leaf nodes.

27. The medium as recited in claim 20, further comprising instructions to:
 perform one or more of the merging tasks while building of the d-ary tree in parallel on a plurality of processing elements in a platform.

28. The medium as recited in claim 20, wherein when each block of merged elements is produced, a size of the block is a multiple of a SIMD width.

\* \* \* \* \*